US011144993B2

(12) United States Patent
Melton

(10) Patent No.: US 11,144,993 B2
(45) Date of Patent: Oct. 12, 2021

(54) DELAY-FREE MATCHING FOR DEEMPHASIZING EFFECTS OF SPEED DIFFERENTIALS AMONG PRICE-MAKERS

(71) Applicant: THOMSON REUTERS GLOBAL RESOURCES UNLIMITED COMPANY, Baar (CH)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 290 days.

(21) Appl. No.: 16/041,966

(22) Filed: Jul. 23, 2018

(65) Prior Publication Data

US 2018/0330440 A1 Nov. 15, 2018

Related U.S. Application Data

(63) Continuation-in-part of application No. 14/533,543, filed on Nov. 5, 2014, now Pat. No. 10,325,317.
(Continued)

(51) Int. Cl.
*G06Q 40/04* (2012.01)
*G06Q 10/10* (2012.01)

(52) U.S. Cl.
CPC ............. *G06Q 40/04* (2013.01); *G06Q 10/10* (2013.01)

(58) Field of Classification Search
CPC ................................. G06Q 40/04; G06Q 10/10
See application file for complete search history.

(56) References Cited

U.S. PATENT DOCUMENTS 7,469,324 B2 12/2008 Tene
8,533,100 B2 9/2013 Cushing
(Continued)

FOREIGN PATENT DOCUMENTS

CA     2956079     2/2016
CA     2944925 A1     4/2016
(Continued)

OTHER PUBLICATIONS

"Not All Speed Bump Markets are Created Equal: Unintended Consequences, Conflicts of Interest and the Chaos that will Stem from a Partial Order Protection Rule", An Aequitas Neo Exchange Position Paper, Jul. 2015, 6 pages.
(Continued)

*Primary Examiner* — Scott C Anderson
*Assistant Examiner* — Matthew Cobb
(74) *Attorney, Agent, or Firm* — Sheppard Mullin Richter & Hampton LLP

(57) ABSTRACT

The invention relates to improved computer systems mitigating the effects of computational incongruencies of Electronic Trading Venue ("ETV") computers based on selection of orders, received at the ETV via a network from the computers, using randomization and delay-free mechanisms. To address High Frequency Trading and improve the efficiency of the computer system of an ETV, the system may immediately, without introducing a batching or randomization delay, place maker orders into an electronic order book. If a taker order is received that is price-compatible with previously received maker orders in the electronic order book, the system may batch the maker orders in the electronic order book for randomization. As such, batching and randomization processes do not use network and computational resources of the computer system unless they are actually necessary, and are typically not
(Continued)

employed when maker orders are canceled after their initial entry into the electronic order book.

20 Claims, 4 Drawing Sheets

Related U.S. Application Data

(60) Provisional application No. 62/648,459, filed on Mar. 27, 2018, provisional application No. 62/029,042, filed on Jul. 25, 2014, provisional application No. 61/900,087, filed on Nov. 5, 2013.

(56) References Cited

U.S. PATENT DOCUMENTS

| | | | |
|---|---|---|---|
| 8,719,146 B2 | 5/2014 | Sellberg | |
| 9,667,751 B2 | 5/2017 | Fallon | |
| 9,672,565 B2 | 6/2017 | Parsons | |
| 10,325,317 B2* | 6/2019 | Melton | G06Q 40/04 |
| 2002/0023048 A1 | 2/2002 | Buhannic | |
| 2002/0057717 A1 | 5/2002 | Mallory | |
| 2002/0178108 A1 | 11/2002 | Tresser | |
| 2004/0042506 A1 | 3/2004 | Fallon | |
| 2008/0228622 A1* | 9/2008 | Adcock | G06Q 40/00 705/37 |
| 2008/0243675 A1 | 10/2008 | Parsons | |
| 2008/0275806 A1 | 11/2008 | Raitsev | |
| 2008/0301061 A1 | 12/2008 | Kittelsen | |
| 2009/0181777 A1 | 7/2009 | Christiani | |
| 2009/0210337 A1 | 8/2009 | Mahoney | |
| 2010/0036763 A1 | 2/2010 | Driscoll | |
| 2011/0040669 A1 | 2/2011 | Lee | |
| 2011/0047104 A1 | 2/2011 | Czupek | |
| 2012/0054084 A1 | 3/2012 | Wolf | |
| 2012/0089496 A1 | 4/2012 | Taylor | |
| 2013/0275284 A1 | 10/2013 | Messina | |
| 2013/0297478 A1 | 11/2013 | Mannix | |
| 2014/0180904 A1 | 6/2014 | Parsons | |
| 2015/0006349 A1 | 1/2015 | Eddy | |
| 2015/0006350 A1 | 1/2015 | Prasad | |
| 2015/0066727 A1 | 3/2015 | Wepsic | |
| 2015/0073963 A1* | 3/2015 | Kane | G06Q 40/04 705/37 |
| 2015/0073967 A1 | 3/2015 | Katsuyama | |
| 2015/0073970 A1 | 3/2015 | Merold | |
| 2015/0127519 A1 | 5/2015 | Melton | |
| 2015/0262297 A1 | 9/2015 | Callaway | |
| 2015/0356679 A1 | 12/2015 | Schmitt | |
| 2016/0104242 A1 | 4/2016 | Melton | |
| 2016/0364437 A1 | 12/2016 | Djurdjevic | |
| 2017/0236202 A1* | 8/2017 | Melton | G06Q 40/04 705/37 |
| 2018/0191624 A1* | 7/2018 | Haynold | H04L 47/33 |
| 2018/0262455 A1* | 9/2018 | Acuna-Rohter | H04L 67/32 |
| 2019/0311433 A1* | 10/2019 | Schmitt | G06Q 40/06 |
| 2021/0182965 A1* | 6/2021 | Bonig | G06Q 20/00 |

FOREIGN PATENT DOCUMENTS

| | | | | |
|---|---|---|---|---|
| EP | 1605384 | | 12/2005 | |
| EP | 3223226 A1 * | | 9/2017 | G06Q 40/04 |
| EP | 3223226 A1 | | 9/2017 | |
| EP | 3566403 A1 * | | 11/2019 | H04L 47/283 |
| JP | 2012515991 | | 7/2012 | |
| WO | 2001098961 A2 | | 12/2001 | |
| WO | 2014055130 A1 | | 4/2014 | |

OTHER PUBLICATIONS

"Turquoise Uncross" Factsheet, London Stock Exchange Group, <URL: http://www.lseg.com/sites/default/files/content/documents/Turquoise%20Uncross%20Factsheet.pdf>, 2016, 1 page.

Aldrick, Philip, "The Brit Beating the Forex Flash Boys in Less Time than the Blink of an Eye: High-Frequency Trading is Timed in Milliseconds, But It Has Taken Several Years to Challenge It", The Times, Nov. 21, 2015, 6 pages.

Alpha Exchange Inc., Notice of Proposed Rule Amendments and Request for Comments on the Trading Policy Manual, URL: <http://www.osc.gov.on.ca/documents/en/Marketplaces/alpha-exchange_20141106_amd-request-for-comments.pdf>, 59 pages.

Aquilina, Matteo, et al., "Dark Pool Reference Price Latency Arbitrage", <URL: http://ifrogs.org/PDF/CONF_2017/Aquilina_Foley_Oneill_Ruf_2017.pdf>, May 10, 2017, 55 pages.

Brown, Alasdair, et al., "Slowing Down Fast Traders: Evidence from the Betfair Speed Bump", School of Economics, University of East Anglia, Norwich, U.K., Jun. 21, 2016, 51 pages.

Budish, Eric et al., "Implementation Details for Frequent Batch Auctions: Slowing Down Markets to the Blink of an Eye", American Economic Review, vol. 104, No. 5, May 2014, 7 pages.

Budish, Eric et al., "The High-Frequency Trading Arms Race: Frequent Batch Auctions as a Market Design Response", Dec. 23, 2013, 70 pages.

Curex FX ECN Index Liquidity Pool Rules, Version 3, Dec. 19, 2014, Curex Innovations LLC, 9 pages.

Eholzer, W., "Some Insights Into the Details that Matter for High-Frequency Trading!", Eurez Exchange's T7, www.eurexchange.com, Nov. 2013, 40 pages.

Farmer, J.Doyne, "Review of the Benefits of a Continuous Market Vs. Randomised Stop Auctions and of Alternative Priority Rules (policy options 7 and 12)", European Commission Public Consultation; Review of the Markets in Financial Instruments Directive , Mar. 28, 2012, 25 pages.

Gode, Dhananjay K., et al., "Designing Electronic Markets: On the Impossibility of Equitable Continuously-Clearing Mechanisms with Geographically Distributed Agents", <URL: https://www.frbatlanta.org/-/media/documents/filelegacydocs/ACF35B.pdf>, Feb. 2000, 12 pages.

Gode, Dhananjay K., et al., "On the Impossibility of Equitable Continously-Clearing Markets with Geographically Distributed Traders", <URL: http://faculty.som.yale.edu/shyamsunder/Research/Experimental%20Economics%20and%20Finance/Presentations%20and%20Working%20Papers/Network/Design13march2000.pdf>, Feb. 2000, 15 pages.

Gordon, Ethel Sherry, "New Problems in Queues: Social Injustice and Server Production Management", Ph.D. Thesis, Massachusetts Institute of Technology, Department of Nuclear Engineering, copyright 1987, 436 pages.

Harris, Larry, "What to Do About High-Frequency Trading", Financial Analysts Journal, CFA Institute, Mar./Apr. 2013, 4 pages.

Jones, Charles M. "What Do We Know About High-Frequency Trading?", Columbia Business School, Version 3.4, Mar. 20, 2013, 56 pages.

Mannix, Brian F., "Regulatory Studies Center: Public Interest Comment on The Security and Exchange Commission's Market Technology Roundtable", The George Washington University, SEC Release No. 34-67802, SEC File No. 4-652, Oct. 23, 2012, 20 pages.

Onstad, Eric et al., "Analysis: 'Slow Frequency' Technology Faces Tough Shift from FX to Stock Markets", printed from , Oct. 2, 2013, 4 pages.

Osipovich, Alexander, "New York Stock Exchange Adopts 'Speed Bump' for One of Its Markets", The Wall Street Journal, Jan. 25, 2017, 2 pages.

Securities and Exchange Commission, Filing by Chicago Stock Exchange, "Proposed Rule Change to Adopt the CHX Liquidity Taking Access Delay", File No. SR-2016-16, <URL: http://www.chx.com/_posts/rule-filings/ProposedFilings/CHX-2016-16.pdf>, Sep. 6, 2016, 123 pages.

Sellberg, Lars-Ivar, "Using Adaptive Micro Auctions to Provide Efficient Price Discovery When Access in Terms of Latency is Differentiated Among Market Participants", White Paper, Cinnober Financial Technology AB, Oct. 20, 2010, 8 pages.

Szalay, Eva, "Life in the Slow Lane", printed from , Automated Trader Magazine, Issue 30, Q3 2013, 2 pages.

(56) References Cited

OTHER PUBLICATIONS

Whitt, Ward, "The Amount of Overtaking in a Network of Queues", Networks, vol. 14, Issue 3, Fall 1984, Wiley Online Library, pp. 411-426.

"Neovest Selects SunGard for Co-location and Direct Market Data Connectivity", Business Wire, Jun. 9, 2003, printed from <URL: https://dialog.proquest.com/professional/docview/ 666838717/168435B5A75497688D3/22?accountid=142257>, 5792,4 pages.

Anonymous, "D: Real-Time Aggregated Datafeeds", Inside Market Data Reference: IMD Reference; ACTIV Financial Systems, London, 2009 (Year: 2009), 34 pages.

* cited by examiner

DELAY-FREE MATCHING FOR DEEMPHASIZING EFFECTS OF SPEED DIFFERENTIALS AMONG PRICE-MAKERS

CROSS-REFERENCE TO RELATED APPLICATIONS

This application claims priority to U.S. Provisional Patent Application No. 62/648,459, filed Mar. 27, 2018, entitled "Delay-Free Matching Algorithm for Deemphasizing Effects of Speed Differentials Among Price-Makers," the contents of which are incorporated by reference in their entireties herein. This application is a continuation-in-part of U.S. patent application Ser. No. 14/533,543, filed Nov. 5, 2014, entitled "Ideal Latency Floor," which claims priority to U.S. Provisional Patent Application No. 62/029,042, filed Jul. 25, 2014, entitled "Ideal Latency Floor," and U.S. Provisional Patent Application No. 61/900,087, filed Nov. 5, 2013, entitled "Random Delay Mechanism," the contents of each of the above applications are incorporated by reference in their entireties herein.

FIELD OF THE INVENTION

The invention relates to improved computer systems that mitigate the effects of computational incongruencies of computers connected to an electronic trading venue based on selection of electronic order messages, received at the electronic training venue via a network from the computers, using randomization and delay-free mechanisms.

BACKGROUND OF THE INVENTION

In the past few years market participants engaged in high frequency or algorithmic trading (herein, simply "HFT") have been responsible for an increasing proportion of the trading volumes transacted on these electronic trading venues. The operators of trading venues and their customers, who are market participants on those trading venues, have been significantly impacted by the rise of HFT. Some market participants have stated that they can no longer afford to make ongoing, significant and sometimes operationally risky investments in cutting edge technology that is required to keep up with the fastest participants. The result of this is that on the many venues with time-priority rules for processing messages, where speed consequently plays a role in determining competitiveness in price making and taking, fewer participants can effectively compete, and competition as a whole on the venue is seemingly reduced by HFT.

The operators of electronic trading venues have themselves been affected by the rise of HFT. As market participants have become faster and faster, smaller and smaller variations in latency on a venue have become increasingly significant in determining which market participant is the most successful in their ability to make or take a price. While the nature of computer hardware and software make it impossible to completely eliminate all variation in latency on an electronic trading venue, it becomes increasingly difficult and expensive for a market operator to monitor and control smaller and smaller variations in latency. Yet a market operator is obliged to do so in order to ensure their venue is "fair" i.e., that no single participant is systematically advantaged (or disadvantaged) in their price making and taking activities as a result of the particular manifestation of latency "jitter" on the venue.

In some systems, a latency floor has been introduced. In those systems, incoming orders are batched based on when the orders have been received. However, these systems, while they can mitigate the effects of HFT, may cause other problems on the computer system operated by the venue. For instance, most orders may be canceled without ever being matched at a specified price level. In these instances, batching these orders wastes computational and network resources, reducing the overall efficiency of the computer system. These and other problems exist with some conventional computer systems of electronic trading venues.

SUMMARY OF THE INVENTION

The invention addressing these and other drawbacks relates to improved computer systems that mitigate the effects of computational incongruencies of computers connected to an electronic trading venue based on selection of electronic order messages, received at the electronic training venue via a network from the computers, using randomization and delay-free mechanisms. To address HFT and improve the efficiency of the computer system of an Electronic Trading Venue ("ETV"), the system may immediately, without introducing a batching or randomization delay, place maker orders into an electronic order book. If a taker order is received that is price-compatible with previously received maker orders in the electronic order book, the system may batch the maker orders in the electronic order book for randomization. As such, batching and randomization processes do not use network and computational resources of the computer system unless they are actually necessary, and may not be used when maker orders are canceled subsequent to their initial entry into the electronic order book.

Upon receipt of an electronic maker order (in which a maker order that does not cross the spread, and does not have a time-in-force of immediate-or-cancel), the maker order is immediately inserted into its instrument's order book on the venue. Hence, electronic maker orders are not subject to a deliberate delay by the venue prior to their insertion into the limit order book. Also upon receipt of the electronic maker order by the venue (or upon its insertion into the order book), a timestamp indicating the current time is inserted into a payload of the electronic maker order. In this way, if the order is subject to matching, the computer system can interrogate the order message's payload to obtain this timestamp and make use of it in its matching rules.

The electronic maker order is inserted into the order book. In particular, the limit price of an electronic maker order determines the price-level in the order book into which it is inserted, and orders are appended to the end of the queue (i.e., appended such that each subsequently appended order has lower priority in the queue than the former) at a price level as they are received.

Upon receipt of an electronic taker order (i.e., an order that crosses the spread) the disclosed algorithm matches first using price-priority, as per a price-time priority. If there are multiple orders at a price-level, instead of matching in strict time-priority (as a price-time priority algorithm would), it instead (1) identifies groups of maker orders submitted in close temporal proximity to one another, (2) groups these maker orders together, and (3) randomizes them based on the sending market participants (or entities) such that a random ordering of those participants in each group determines the priority of the maker orders in the group for matching against the taker order.

With respect to (1) above, the algorithm may identify orders submitted 'in close temporal proximity' to one another by examining the timestamp of the first order in the queue, and adding a fixed value in units time to that timestamp (e.g., the desired 'floor length').

With respect to (2) above, any other orders at the price level with timestamps less than or equal to that of the sum of the first order's and the 'floor length' are determined to belong to the first order's group. Subsequent groups may be established at each price level by reapplying the procedure (i.e., the highest priority order that does not fall into the previous group because its timestamp is too high starts its own group, and other orders are grouped with it that have timestamps less than the sum of its own timestamp and the 'floor length'). In this way groups of orders with 'size'— where size is measured in units time—'floor length' may be established across all maker orders at a price-level in the limit order book.

With respect to (3) the grouping may be per market participant and various draining techniques may be selected by the operator of the venue to provide a priority. Note that as disclosed, draining does not necessarily mean removing the maker orders from the order book—it simply provides a new—and not-strictly-time—priority for the matching of these maker orders. Those maker orders 'drained' earlier will have higher priority for matching than those 'drained' later. A maker order will generally be removed from the order book when its unmatched (open) quantity is zero, or when it's canceled by its sender.

It some instances, only one of the orders in a multi-order group of such orders will be removed due to being completely matched, while other orders in the group will remain in the book (due to the taker order having insufficient quantity to match against all such orders in the group). To preserve the initial grouping—which may otherwise change due to one or more of the orders in the group being matched and removed from the book, and may otherwise be computationally wasteful—upon the initial grouping of the orders by the matching rules, a flag maybe set in the grouped orders respective payloads to indicate those orders have been subject to grouping and resorted in the queue, according to the specific draining technique. The ordering provided by the draining technique may be memorialized by reordering those order messages in the queue, so the group remains at the 'head' of the queue, but so that the ordering of individual orders within the group reflects the draining order.

In such an implementation—where the computer system flags order messages as having previously been grouped, and re-sorts them at the head of the queue—the algorithm will ignore timestamps on orders where this flag has been previously populated so as to avoid attempting to regroup them. Put another way, the presence of this flag will indicate to the algorithm that timestamp-based grouping and reordering has already been performed, and that this should not be re-performed.

To ensure more consistent response times in matching the computer system may be 'lazy' (cf. 'eager' or 'greedy', as the terms are used in the computer programming language literature) in its construction of groups. What this means is that instead of computing all groups at a price-level upon receipt of a taker order, each subsequent group after the first is only computed if open (unmatched) quantity remains on the taker order and no orders remain in the first group because they have been matched.

Notwithstanding the above details, the computer system may otherwise implement price-time priority matching in its matching of taker orders with maker orders. In particular, maker orders are removed from the order book when they are completely filled or otherwise canceled by their sender; matching of a taker order concludes when no maker orders remain in the limit order book with which it is price-compatible or when its open quantity has been completely filled by such maker orders.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
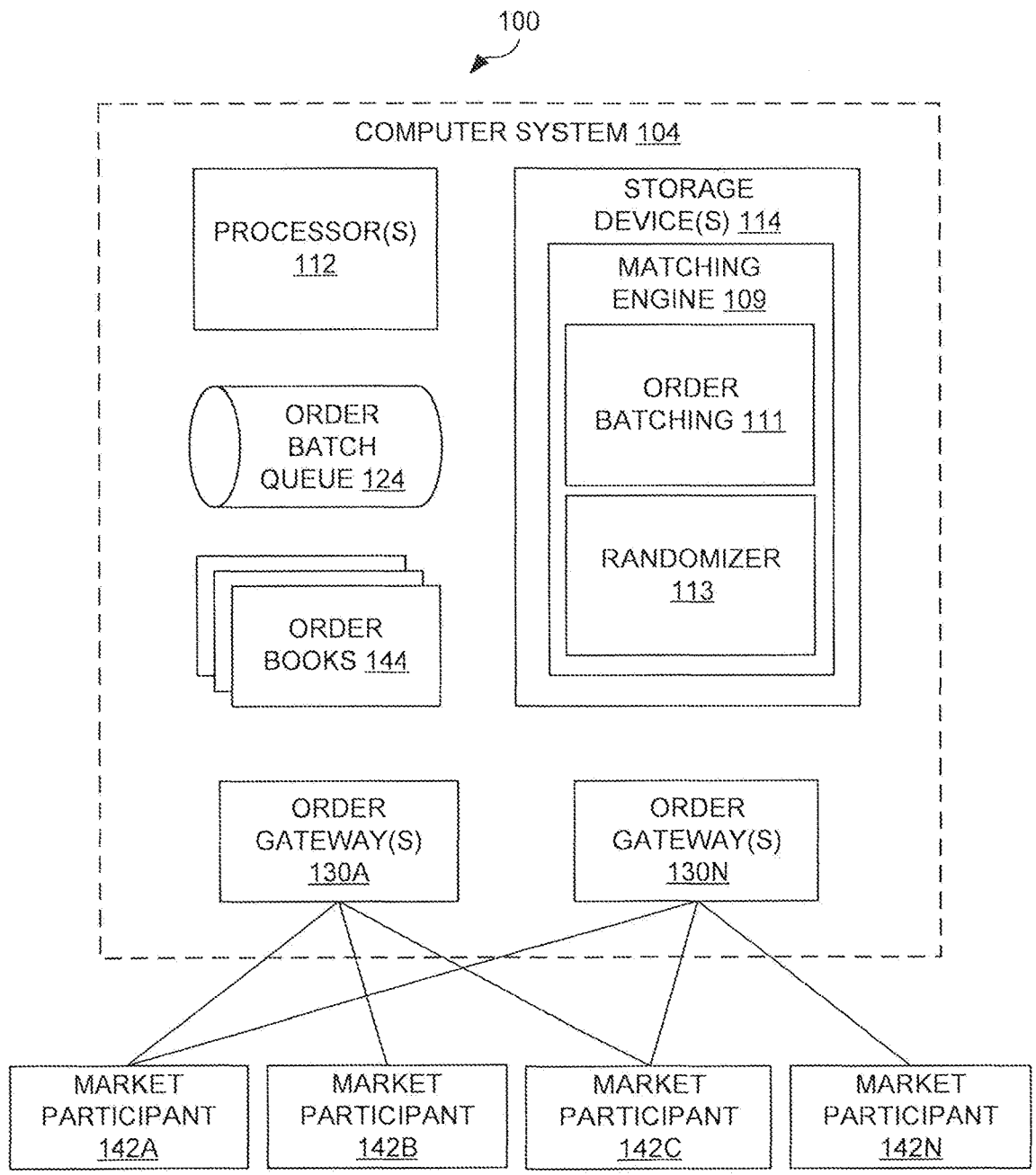
FIG. 1 illustrates a system of providing a delay-free latency floor mechanism, according to an implementation of the invention.

FIG. 1 illustrates a system 100 of providing a delay-free latency floor mechanism, according to an implementation of the invention. System 100 may include a computer system 104 of an electronic trading venue that receives and matches electronic order messages from market participants 142A-N via a network.

The market participants 142 may be, but are not limited to, customers, market makers, broker/dealer systems, electronic communication networks (ECNs), and other exchanges. For example, a market maker may include any individual or firm that submits and/or maintains both bid and offer orders simultaneously for the same instrument. A customer may be any entity, such as an individual, group of individuals or firm that engages in trading activity via system 100 and is not a market maker. For example, a customer may be an individual investor, a group of investors, or an institutional investor. In an implementation, the market participants may include a process to enter orders into the computer system 104.

The computer system 104 may include one or more processors 112, one or more storage devices 114, and/or other components. Processor(s) 112 may be programmed by one or more computer program instructions, which may be stored in storage device(s) 114. The one or more computer program instructions may include, without limitation, a matching engine 109.

The matching engine 109 may employ matching rules for processing and matching electronic order messages. The matching rules may improve the efficiency of the computer system 104, as well as improve market participant 142 interactions thereof, by programming the computer system to perform delay-free matching while mitigating and addressing the effects of HFT. The rules may be encoded in instructions for order batching 111 (which may generate one or more order batch queues 124), a randomizer 113, and/or other instructions. These rules, due to the nature of electronic order messaging processing in a computer system of an electronic trading venue (i.e., due to the nano- and micro-second processing times required of the computer system), specifically are used by the computer system 104.

In some instances, the matching rules may specify that the processing techniques described in U.S. patent application Ser. No. 14/533,543 ("Ideal Latency Floor"), which has already been incorporated by reference, be used instead the disclosure described herein. In some instances, a venue operator may specify that for some orders be processed according to the Ideal Latency Floor of U.S. patent application Ser. No. 14/533,543, while other orders be processed as disclosed herein. As such, the computer system 104 may be programmatically configured to operate as needed.

The matching engine 109 may receive electronic order messages that specify orders (e.g., e.g., cancels, replaces, new order requests, etc.) from market participants 142 via one or more order gateways 130 (illustrated as order gateways A, N). The electronic order messages may be formatted according to a FIX message format, although other types of formats may be used. An electronic order message that specifies an order will be referred to herein as an "electronic order" or interchangeably with "order" for convenience. For example, an electronic order message that specifies a maker order will be referred to herein as an "electronic maker order" or "maker order" for convenience. Likewise, an electronic order message that specifies a taker order will be referred to herein as an "electronic taker order" or "taker order" for convenience.

Market participants 142 may log onto the computer system 104, which may create an order session. During a given order session, a market participant 142 may submit orders through order gateway 130. The order sessions may be stored in an orders and sessions database. The stored order sessions may log the orders, which may each identify a market participant 142 that submitted it and its order details. Order gateways 130 transmit the orders to matching engine 109.

Based on the orders, matching engine 109 may maintain one or more electronic order books 144, which may track a bid or offer state for the instruments that trade on them. A bid or offer state is indicative of bids and/or offers with respect to the instrument. One example of a bid or offer state is the state of a central limit order book ("CLOB"), although other types of mechanisms may be used to track bid or offer states. The term "CLOB" is used by example and not limitation. Other ways to maintain a bid or offer state may be used as well so as aggregate supply and demand, perform matching, organize orders, etc., on a given instrument or group of instruments.

In some instances, the matching engine 109 may insert, without an intentional delay (e.g., without a deliberate delay based on randomization and/or batching imposed by the ETV), electronic maker orders that specify a price level at which it will be matched to an electronic taker order for the same financial instrument. Maker orders add or provide liquidity to the CLOB because they can be matched to taker orders. Taker orders consume liquidity from the CLOB because they match maker orders in the CLOB based on its price level being matched to the price level of a maker order.

When the computer system 104 receives an electronic maker order, the computer system may obtain a trusted time and insert the trusted time into a payload of the electronic order message. For example, the trusted time may be inserted as a key-value pair in of a FIX message format. Various components may insert the trusted time. For example, the order gateways 130 may insert the trusted time upon receipt. In other examples, the matching engine 109 may insert the trusted time prior to or after placing the electronic maker order into the electronic order book 144.

Figure 2:
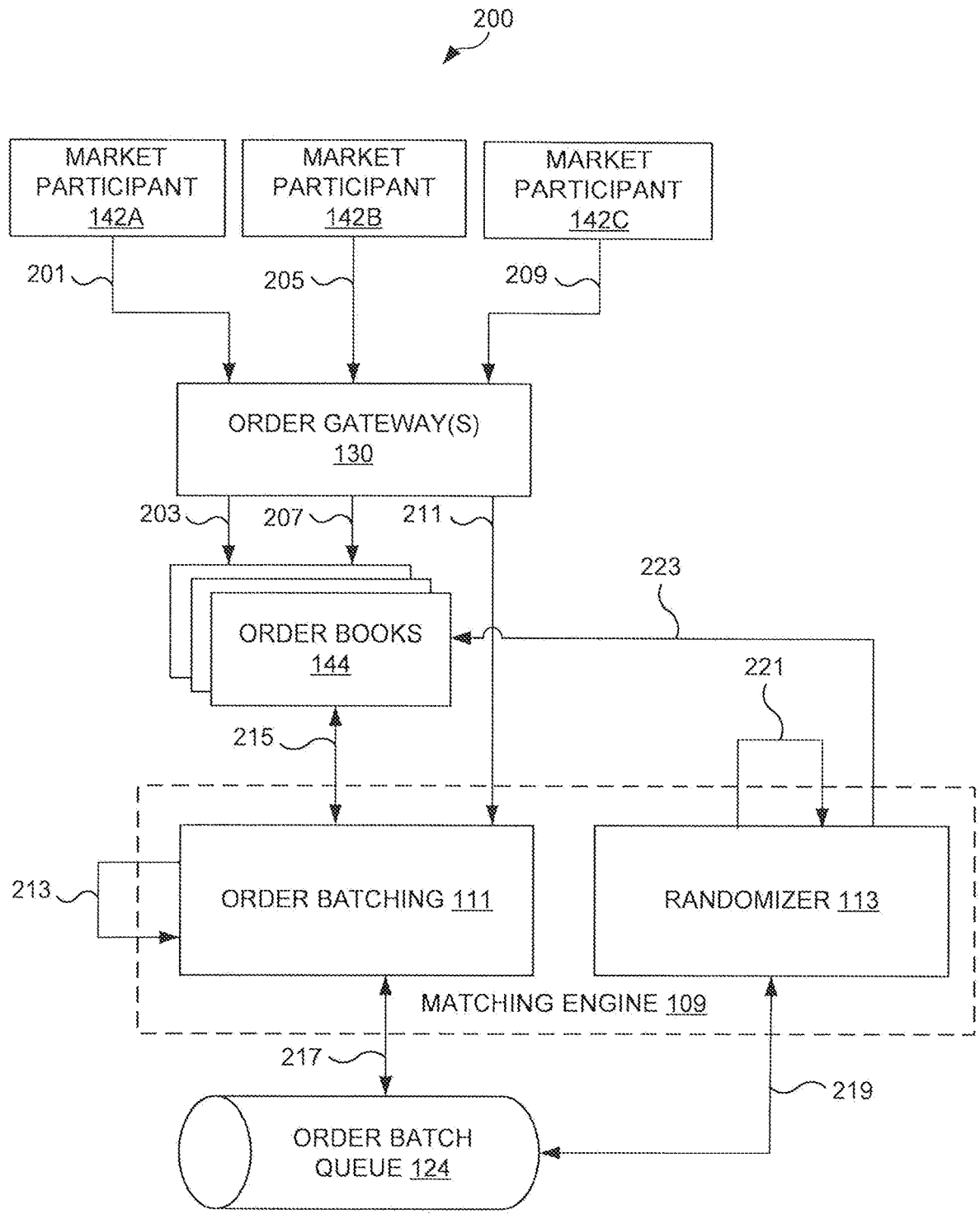
FIG. 2 depicts a data flow diagram for providing a delay-free latency floor mechanism, according to an implementation of the invention.

FIG. 2 depicts a data flow diagram 200 for providing a delay-free latency floor mechanism, according to an implementation of the invention.

At 201, an order gateway 130 may receive a first electronic maker order for a financial instrument from a first market participant 142A.

At 203, the order gateway 130 may transmit the first electronic maker order for entry into the electronic order book 144. In some instances, the first electronic maker order may be transmitted to a matching engine 109 for insertion into the electronic order book 144 at a price level specified by the first electronic maker order.

At 205, an order gateway 130 may receive a second electronic maker order for the financial instrument from a second market participant 142B. The order gateway 130 that received the second electronic maker order may be the same or different order gateway that received the first electronic maker order.

At 207, the order gateway 130 may transmit the second electronic maker order for entry into the electronic order book 144. In some instances, the second electronic maker order may be transmitted to a matching engine 109 for insertion into the electronic order book 144 at a price level specified by the second electronic maker order.

At 209, an order gateway 130 may receive an electronic taker order for the financial instrument from a third market participant 142C at a price level specified by the electronic taker order. At 211, the order gateway 130 may forward the electronic taker order to the matching engine 109. At 213, responsive to receipt of the electronic taker order, the matching engine 109 may determine whether an order batch queue exists for the financial instrument at the appropriate price level. If the order batch queue exists, the matching engine 109 may randomly select the next maker order in the order batch queue as described below at 221.

If the order batch queue for the financial instrument at the appropriate price does not exist, responsive to receipt of the electronic taker order, at 215, the order batching 111 may be executed by the processor 112 to identify maker orders at the appropriate price in the electronic order book 144 for the financial instrument that have not been grouped into an order batch queue. For example, electronic maker orders that have been grouped into an order batch queue may each be associated with a flag that indicates that it has been batched. The flag may be stored in a memory in association with the electronic maker order or the flag may be set as a FIX order message key-value pair. In this manner, the order batching 111 may identify electronic maker orders in the electronic order book that have not been grouped into an order batch queue. Instead of receipt of a maker order triggering a batching, receipt of a taker order triggers batching disclosed herein.

At 217, the order batching 111 may generate an order batch queue 124 that includes one or more of the identified electronic maker orders for matching with the electronic taker order. The order batching 111 may do so as follows. The order batching 111 may interrogate the payload of each of the identified electronic maker orders for the financial instrument at the price level specified by the electronic taker order. The order batching 111 may then batch together any matching electronic maker orders in the electronic order book 144 based on respective timestamps from each of the interrogated payloads that are close in time together. For example, the order batching 111 may identify the earliest timestamp among the preliminarily matched (based on price) electronic maker orders, apply a latency floor by adding the latency floor to the earliest timestamp to generate a batching period, and group together the preliminarily matched electronic maker orders that have timestamps within the batching period. For each electronic maker order placed in the order batch queue 124, the order batching 111 may set a flag to indicate that the electronic maker order has been batched.

At 219, the randomizer 113 may be executed by the processor 112 to randomize the order batch queue 124. For example, each of the electronic maker orders in the order batch queue 124 may be grouped by the market participant 142 that submitted them, shuffling the list of participants so as to arrive at a random ordering. At 221, the randomizer 113 may use the shuffled list of participants as input to a predetermined "drain" strategy that removes the electronic maker orders from the order batch queue 124 for processing against the electronic order book 144. Various randomization and draining strategies may be employed, as described in U.S. patent application Ser. No. 14/533,543, which has already been incorporated by reference.

At 221, the randomizer 113 may cause orders to be matched according to the drain strategy, and the order books 144 may be updated at 223 to reflect the matched orders. For example, electronic maker orders that have been matched may be removed from the order books 144 or otherwise updated to indicate they have been matched.

Figure 3:
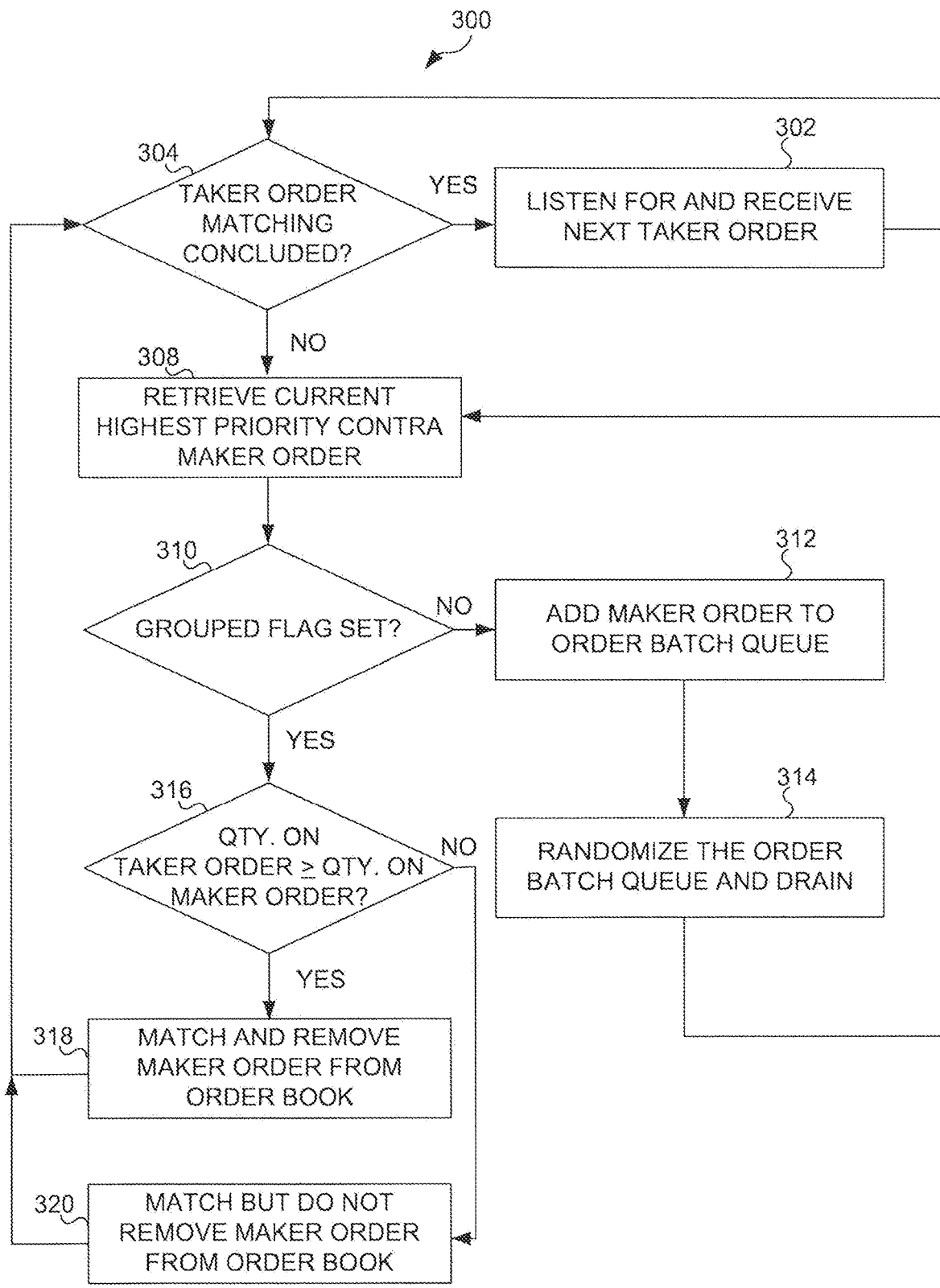
FIG. 3 depicts an example of a process for providing a delay-free latency floor mechanism, according to an implementation of the invention.

FIG. 3 depicts an example of a process 300 for providing a delay-free latency floor mechanism, according to an implementation of the invention.

In an operation 302, process 300 may include listening for and receiving an electronic taker order.

In an operation 304, process 300 may include determining whether taker order matching has concluded (indicating that the taker order has been completely filled). If so, process 300 may return to operation 302. If not, process 300 may proceed to operation 308.

In an operation 308, process 300 may include retrieving the current highest priority contra maker order from electronic order book 144. This is the first in queue at best price-level in the electronic order book 144.

In an operation 310, process 300 may include determining whether the current highest priority contra maker order has a flag that indicates it has been grouped. If not, process 300 may proceed to operation 312.

In operation 312, process 300 may include adding the maker order to an order batch queue 124.

In an operation 314, process 300 may include randomizing the order batch queue 124 and draining the queue for matching with the taker order. Process 300 may return to operation 308.

Returning to operation 310, if the current highest priority contra maker order does not have a flag indicating it has been grouped, process 300 may proceed to operation 316.

In operation 316, process 300 may include determining whether an open quantity on the taker order is greater than or equal to the open quantity on the maker order. If not (indicating more maker orders are needed to completely fill the taker order), process 300 may proceed to operation 320. If yes, process may proceed to operation 318.

In operation 318, process 300 may include matching the maker order and removing it from the electronic order book.

In operation 320, process 300 may include matching, but not removing, the maker order from the electronic order book.

Figure 4:
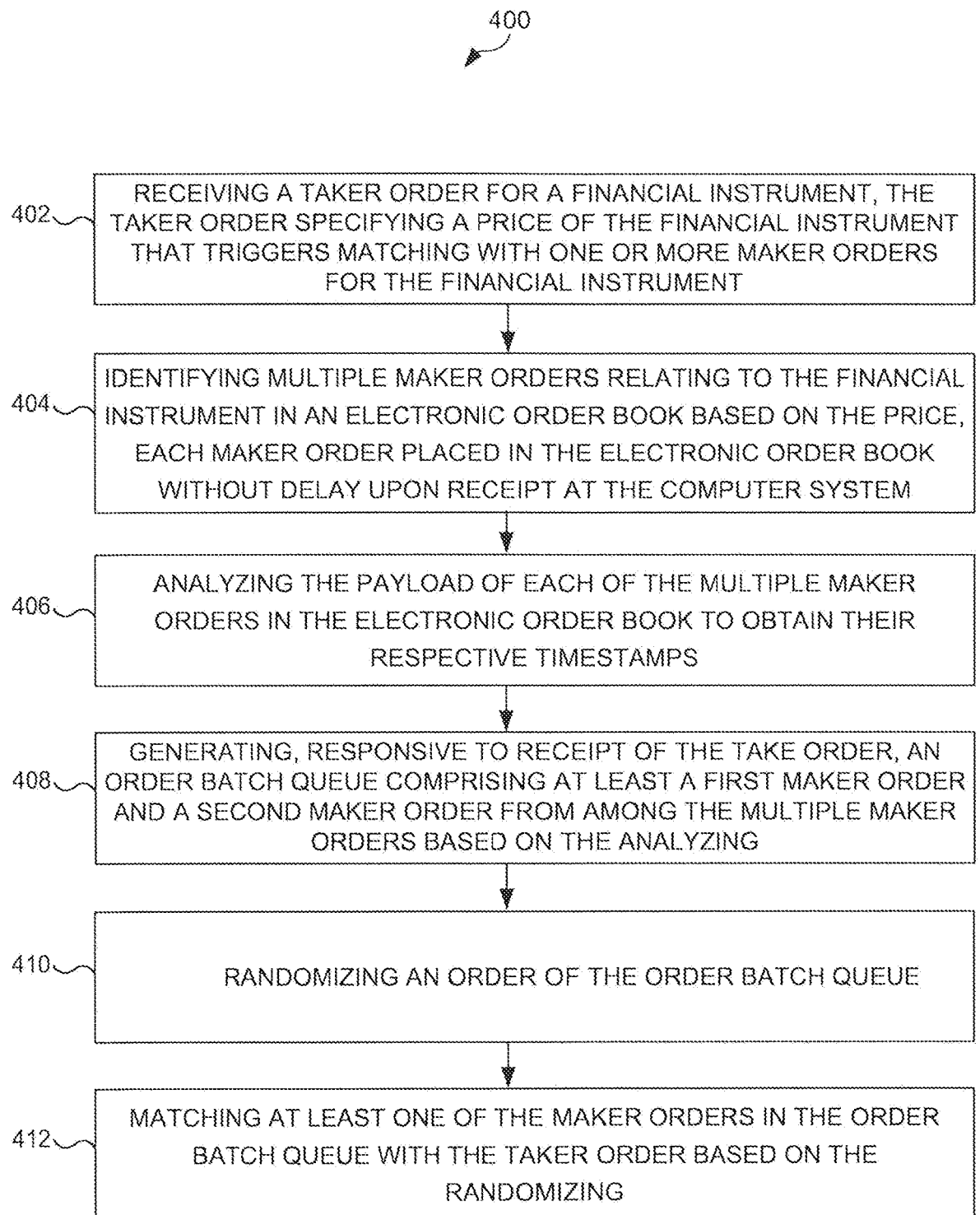
FIG. 4 depicts an example of a process for providing a delay-free latency floor mechanism, according to an implementation of the invention.

FIG. 4 depicts an example of a process 400 for providing a delay-free latency floor mechanism, according to an implementation of the invention.

In an operation 402, process 400 may include receiving a taker order for a financial instrument, the taker order specifying a price of the financial instrument that triggers matching with one or more maker orders for the financial instrument.

In an operation 404, process 400 may include identifying multiple maker orders relating to the financial instrument in an electronic order book based on the price, each maker order placed in the electronic order book without an intentional delay upon receipt at the computer system and each having an electronic payload that includes a timestamp at which the maker order was received.

In an operation 406, process 400 may include analyzing the payload of each of the multiple maker orders in the electronic order book to obtain their respective timestamps.

In an operation 408, process 400 may include generating, responsive to receipt of the take order, an order batch queue comprising at least a first maker order and a second maker order from among the multiple maker orders based on the analyzing.

In an operation 410, process 400 may include randomizing an order of the order batch queue. In an operation 412, process 400 may include matching at least one of the maker orders in the order batch queue with the taker order based on the randomizing.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise cloud or cloud storage, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases (such as orders and sessions database) described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of providing delay-free matching in an electronic trading venue, the method being implemented in a computer system having one or more physical processors programmed with computer program instructions that, when executed by the one or more physical processors, cause the computer system to perform the method, the method comprising:

receiving a taker order for a financial instrument, the taker order specifying a price of the financial instrument that triggers matching with one or more maker orders for the financial instrument;

identifying multiple maker orders relating to the financial instrument in an electronic order book based on the price, each maker order placed in the electronic order book, without an intentional system-imposed delay resulting from an initial batching or randomization operation, upon receipt at the computer system and each having an electronic payload that includes a timestamp at which the maker order was received;

analyzing the payload of each of the multiple maker orders in the electronic order book to obtain their respective timestamps;

generating, responsive to receipt of the taker order, an order batch queue comprising at least a first maker order and a second maker order from among the multiple maker orders based on the analyzing, wherein generating the order batch queue comprises interrogating the payload of and batching together selected maker orders if their timestamps are within a first batching period;

shuffling an order of the selected maker orders in the order batch queue so as to arrive at a random ordering; and matching at least one of the maker orders in the order batch queue with the taker order based on the randomizing.

2. The method of claim 1, wherein generating the order batch comprises:

identifying a set of the multiple maker orders having respective timestamps that indicate they were received within a predefined length of time from one another, the set comprising the first maker order and the second maker order.

3. The method of claim 2, the method further comprising:

prior to receiving the taker order, receiving the first maker order;

inserting, prior to entry into the electronic order book, a first timestamp indicating a time of receipt of the first maker order into a first payload of the first maker order;

prior to receiving the taker order, receiving the second maker order; and inserting, prior to entry into the electronic order book, a second timestamp indicating a time of receipt of the second maker order into a second payload of the second maker order.

4. The method of claim 2, the method further comprising:

prior to receiving the taker order, receiving the first maker order;

inserting, upon entry into the electronic order book, a first timestamp indicating a time of receipt of the first maker order into a first payload of the first maker order;

prior to receiving the taker order, receiving the second maker order; and inserting, upon entry into the electronic order book, a second timestamp indicating a time of receipt of the second maker order into a second payload of the second maker order.

5. The method of claim 1, the method further comprising:

receiving, by the computer system, the first maker order;

immediately placing, by the computer system, the first order into the electronic order book without the system intentionally delaying the first maker order based on batching.

6. The method of claim 1, the method further comprising:

receiving a third maker order prior to generating the order batch;

immediately adding the third maker order to the order batch;

receiving a cancel of the third maker order; and removing the third maker order from the electronic order book.

7. The method of claim 1, the method further comprising:
storing an indication that the first maker order as having been batched, wherein the first maker order remains in the order batch queue until it is filled.

8. The method of claim 1, wherein randomizing the batch queue comprises:
identifying a first market participant that submitted the first maker order;
identifying a second market participant that submitted the second maker order;
generating a random listing of the first market participant and the second market participant;
wherein matching at least one of the maker orders in the order batch queue with the taker order is based on the random listing.

9. A system of providing delay-free matching in an electronic trading venue, the system comprising:
a computer system comprising one or more physical processors programmed by computer program instructions that, when executed, programs the computer system to:
receive a taker order for a financial instrument, the taker order specifying a price of the financial instrument that triggers matching with one or more maker orders for the financial instrument;
identify multiple maker orders relating to the financial instrument in an electronic order book based on the price, each maker order placed in the electronic order book, without an intentional system-imposed delay resulting from an initial batching or randomization operation, upon receipt at the computer system and each having an electronic payload that includes a timestamp at which the maker order was received;
analyze the payload of each of the multiple maker orders in the electronic order book to obtain their respective timestamps;
generate, responsive to receipt of the taker order, an order batch queue comprising at least a first maker order and a second maker order from among the multiple maker orders based on the analyzing, wherein generating the order batch queue comprises interrogating the payload of and batching together selected maker orders if their timestamps are within a first batching period;
shuffle an order of the selected maker orders in the order batch queue so as to arrive at a random ordering; and
match at least one of the maker orders in the order batch queue with the taker order based on the randomization.

10. The system of claim 9, wherein to generate the order batch, the computer system is further programmed to:
identify a set of the multiple maker orders having respective timestamps that indicate they were received within a predefined length of time from one another, the set comprising the first maker order and the second maker order.

11. The system of claim 10, wherein the computer system is further programmed to:
prior to receipt of the taker order, receive the first maker order;
insert, prior to entry into the electronic order book, a first timestamp indicating a time of receipt of the first maker order into a first payload of the first maker order;
prior to receipt of the taker order, receive the second maker order; and
insert, prior to entry into the electronic order book, a second timestamp indicating a time of receipt of the second maker order into a second payload of the second maker order.

12. The system of claim 10, wherein the computer system is further programmed to:
prior to receipt of the taker order, receive the first maker order;
insert, upon entry into the electronic order book, a first timestamp indicating a time of receipt of the first maker order into a first payload of the first maker order;
prior to receipt of the taker order, receive the second maker order; and
insert, upon entry into the electronic order book, a second timestamp indicating a time of receipt of the second maker order into a second payload of the second maker order.

13. The system of claim 9, wherein the computer system is further programmed to:
receive the first maker order;
immediately place, by the computer system, the first order into the electronic order book without the system intentionally delaying the first maker order based on batching.

14. The system of claim 9, wherein the computer system is further programmed to:
receive a third maker order prior to generating the order batch;
immediately add the third maker order to the order batch;
receive a cancel of the third maker order; and
remove the third maker order from the electronic order book.

15. The system of claim 9, wherein the computer system is further programmed to:
store an indication that the first maker order as having been batched, wherein the first maker order remains in the order batch queue until it is filled.

16. The system of claim 9, wherein to randomize the batch queue, the computer system is further programmed to:
identify a first market participant that submitted the first maker order;
identify a second market participant that submitted the second maker order;
generate a random listing of the first market participant and the second market participant;
wherein at least one of the maker orders in the order batch queue is matched with the taker order based on the random listing.

17. A non-transitory computer readable medium storing computer instructions for of providing delay-free matching in an electronic trading venue, the instructions, when executed by one or more physical processors of a computer system, program the computer system to:
receive a taker order for a financial instrument, the taker order specifying a price of the financial instrument that triggers matching with one or more maker orders for the financial instrument;
identify multiple maker orders relating to the financial instrument in an electronic order book based on the price, each maker order placed in the electronic order book, without an intentional system-imposed delay resulting from an initial batching or randomization operation, upon receipt at the computer system and each having an electronic payload that includes a timestamp at which the maker order was received;
analyze the payload of each of the multiple maker orders in the electronic order book to obtain their respective timestamps;
generate, responsive to receipt of the taker order, an order batch queue comprising at least a first maker order and a second maker order from among the multiple maker orders based on the analyzing, wherein generating the order batch queue comprises interrogating the payload of and batching together selected maker orders if their timestamps are within a first batching period;

shuffle an order of the selected maker orders in the order batch queue so as to arrive at a random ordering; and match at least one of the maker orders in the order batch queue with the taker order based on the randomization.

18. The non-transitory computer readable medium of claim 17, wherein to generate the order batch, the instructions further program the computer system to:

identify a set of the multiple maker orders having respective timestamps that indicate they were received within a predefined length of time from one another, the set comprising the first maker order and the second maker order.

19. The non-transitory computer readable medium of claim 18, wherein the instructions further program the computer system to:

prior to receipt of the taker order, receive the first maker order;

insert, prior to entry into the electronic order book, a first timestamp indicating a time of receipt of the first maker order into a first payload of the first maker order;

prior to receipt of the taker order, receive the second maker order; and insert, prior to entry into the electronic order book, a second timestamp indicating a time of receipt of the second maker order into a second payload of the second maker order.

20. The non-transitory computer readable medium of claim 18, wherein the instructions further program the computer system to:

prior to receipt of the taker order, receive the first maker order;

insert, upon entry into the electronic order book, a first timestamp indicating a time of receipt of the first maker order into a first payload of the first maker order;

prior to receipt of the taker order, receive the second maker order; and insert, upon entry into the electronic order book, a second timestamp indicating a time of receipt of the second maker order into a second payload of the second maker order.

* * * * *